UNITED STATES PATENT OFFICE.

PIUS AMMANN, OF MUNICH, GERMANY.

METHOD OF TREATING MALT-HUSKS.

SPECIFICATION forming part of Letters Patent No. 308,398, dated November 25, 1884.

Application filed May 8, 1884. (No specimens.)

*To all whom it may concern:*

Be it known that I, PIUS AMMANN, a citizen of the Empire of Germany, residing at Munich, in said Empire, have invented a new and useful Improvement in the Method of Treating Malt-Husks, commonly called "Grains," which are the spent malt left from brewing and distilling, of which the following is a specification.

The object of my invention is to utilize both the innutritive fibrous matter and the farinaceous nutritive portion of these grains by employing the latter as food for animals and the former for the manufacture of paper.

In carrying out my invention the grains are first dried and then subjected to the operation of crushing-rollers in such a manner that the farinaceous or nutritious matter is entirely disintegrated from the fibrous portion without the latter being reduced to particles of too small size. The disintegrated mass is then subjected to a sifting operation to separate the farinaceous from the fibrous matters. The farinaceous matter which is thus obtained may be used alone as fodder, or it may be mixed with other fodder. The fibrous material thus obtained will serve specially as a substitute for straw in the manufacture of paper, and may be employed in all cases where straw or wood is at present used for this purpose. It is already in such a state of division as will render it much more susceptible to chemical treatment than straw or wood, and it may be treated and employed in a similar manner to straw in the manufacture of paper.

What I claim as my invention, and desire to secure by Letters Patent, is—

The improvement in the utilization of malt husks or grains, consisting in their separation into their farinaceous and nutritious parts and their fibrous innutritious parts, for separate use as food and paper stock, substantially as herein described.

In testimony whereof I have signed my name to this specification in the presence of two subscribing witnesses.

PIUS AMMANN.

Witnesses:
CAESAR RITSEL,
EMIL HENZEL.